Patented Feb. 3, 1925.

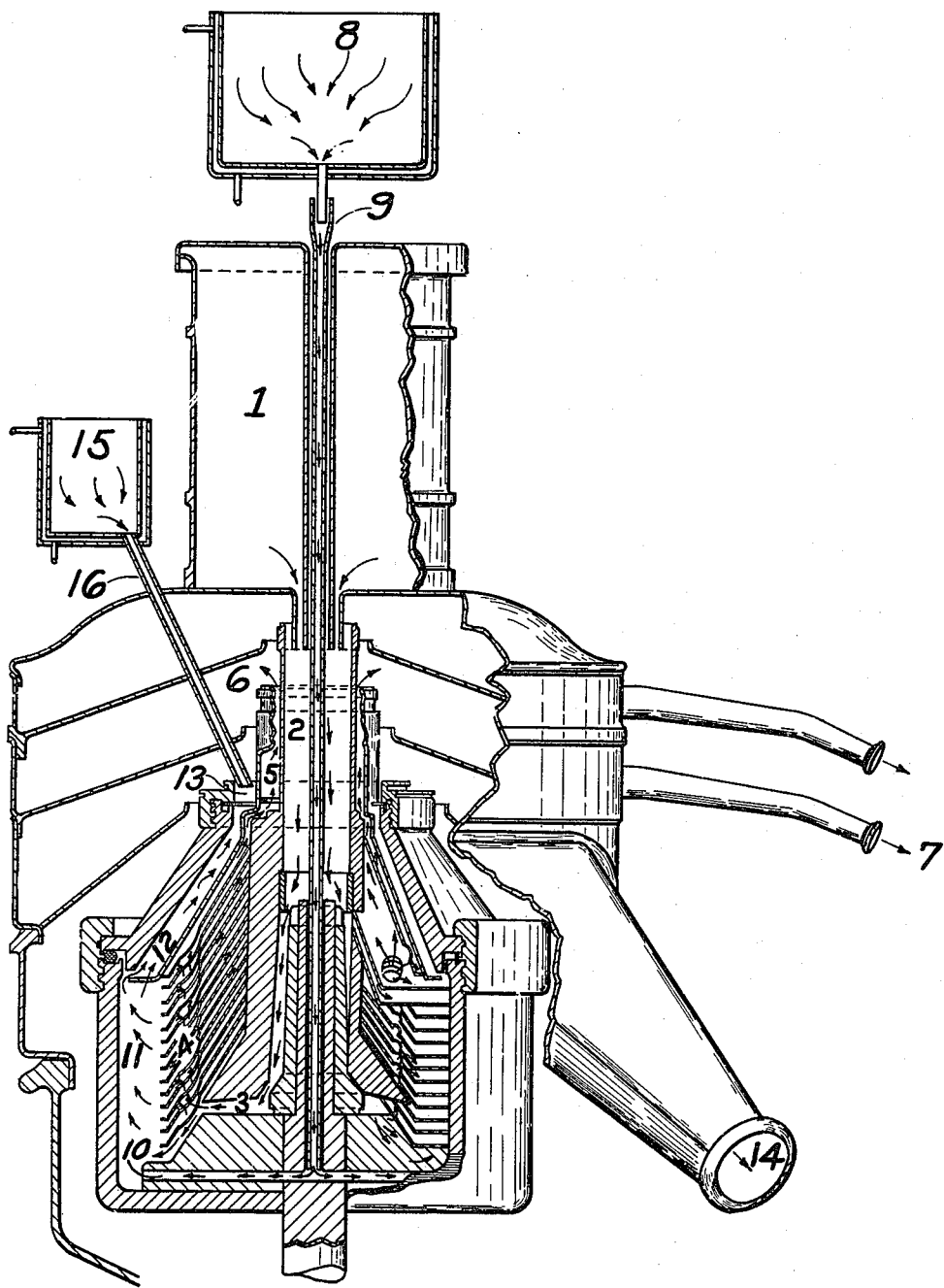

1,525,016

UNITED STATES PATENT OFFICE.

JAMES W. WEIR, OF FILLMORE, CALIFORNIA.

METHOD OF MANUFACTURING LUBRICATING OILS.

Application filed January 10, 1923. Serial No. 611,783.

*To all whom it may concern:*

Be it known that I, JAMES W. WEIR, a citizen of the United States, residing at Fillmore, in the county of Ventura and State of California, have invented certain new and useful Improvements in Methods of Manufacturing Lubricating Oils, of which the following is a specification.

This application is a continuation in part of my application Serial No. 540,060, filed February 20, 1922.

The usual and generally accepted method or process of treating oils for the production of lubricating oils of the desired color resides essentially in the following steps in substantially the order given.

The oil to be treated, heated to a temperature for proper fluidity dependent upon the character of the oil employed, which is usually from 60° F. to 80° F., is first in proper quantity agitated in the presence of sulphuric acid for a given period of time and permitted to settle, and the free acid and products formed by the acid reaction with the oil, commonly known as "sludge" withdrawn. The oil is then subjected to a second agitation and spraying with a suitable neutralizing agent, for instance, sodium hydroxide solution, and permitted to settle, and a withdrawal of the waste alkali and possible products of reaction takes place. A washing by agitation or spraying with water is then resorted to until the oil is free of the alkali, and the settling and withdrawal of the waste water follow. The oil is then heated and air blown through it until the same is free or substantially free of all moisture, and finally the oil is treated by filtration with a decolorizing agent by being passed through a filter bed or medium consisting of mineral earth, usually fuller's earth. This constitutes a somewhat slow and expensive method of treatment.

The foregoing five descriptive steps of operation followed in the order given constitute what is known as a single cycle operation, and is representative of the method generally followed by manufacturers of lubricating oil, each manufacturer varying the quantity of sulphuric acid and neutralizing agent employed as desired; equally so, the time period of treatment.

The objects of the present invention are to facilitate or expedite the operation or period of treatment of the oil and to materially reduce the expense incident to the manufacture of lubricating oils.

Another object is to provide a process for continuously removing sludge from a centrifuge machine while separating sludge from oil, which has heretofore been found impossible owing to its gummy consistency.

Another object is to introduce the step of extracting the last trace of sludge from oil after settling, which is impossible by the settling method, making it possible to remove remaining sulphur dioxide ($SO_2$) from the oil under treatment by heat, with or without the use of air, steam or other inert gas, which has heretofore only been accomplished by a more expensive method and the use of expensive material.

I have discovered that the alkali treatment resorted to and which follows the sulphuric acid treatment may be accomplished with a very materially less quantity of the alkali or alkaline solution by removing that part of the acid reaction products and free acid remaining in the oil which cannot be settled out by gravity in the process by some means. Heretofore this has been accomplished by the expensive means of filtering with some substance such as fuller's earth, followed by passing steam through the filtered oil. I have found that this remaining sludge can be removed by centrifugal force, thereby saving the expense of filtering and filter material. I have also found that if this part of the acid reaction products and free acid be removed (otherwise the oil under treatment will darken), the remaining acid reaction products sulphur dioxide ($SO_2$) and acid reaction products forming $SO_2$ by decomposition can be removed by the application of heat to the oil during mechanical agitation with or without the use of air, steam or other inert gas passing therethrough, raising the temperature sufficiently to completely neutralize the oil without the use of any neutralizing agent. The temperature necessary to accomplish or complete the neutralization of the oil without the use of an alkali ranges from 180° to 350° F. The use of air, steam or other inert gas expedites but is not essential to the process.

It will be noted from the above that the extraction of the final traces of sludge and free acid from the oil, which is not possible by the regular settling method, will materially reduce the manufacturing cost of a finished lubricating oil if it can be accomplished cheaply.

The main difficulty in extracting the sludge with the present centrifuge machine is that owing to its viscosity, gummy consistency and adhesive nature, it will not flow freely from the machine. It is necessary by present practice to use removable bowls and connecting parts on the centrifuge machines for frequent removal of the tarry mass, and the cleaning of the bowls or other parts of the machines is a tedious and expensive process and prevents continuous operation.

I have found that with a properly constructed machine this sludge may be washed continuously from the bowl and other parts of the machine with which it comes in contact by the introduction and admixture of an alkaline solution of the proper chemical formula to react with the sludge, or any suitable solvent or miscible substance such as alcohol, acetone, benzol, carbon tetrachloride or similar substances. The alkaline solution or the solvent or miscible substance must be introduced at proper temperature into the centrifuge machine to mix with the sludge after the separation, within and before leaving the machine, of the sludge from the oil, and the machine must be so constructed that the alkaline solution or the solvent or miscible substance will only come in contact, within the machine, with the sludge after it has been removed and not with the oil either before separation of the sludge or after separation has been accomplished within the machine.

Suitable centrifuge machines are already manufactured and on the market for accomplishing the process herein described, two of which are known as the De Laval centrifuge machine and the Sharples centrifuge machine.

The accompanying drawing illustrates diagrammatically structural features adapted for use in carrying out the operations as described in these specifications. The machine is so well known that means for operating same are not shown, but only those parts which are necessary to clearly illustrate the method described.

Referring to the drawing, the method of operating and accomplishing the purpose is as follows:

Oil containing sludge is charged into feed tank 1 and flows through central feed shaft 2 downward through outlet 3 below partially separated oil between discs at 4, where separation takes place. Pure oil passes upward from inner ends of discs through passage 5 and is discharged at outlet 6, from whence it overflows through pipe 7 for disposal. The sludge separated from the pure oil between discs at 4 is thrown by centrifugal force through the outer ends of discs to outer part of bowl, 11, where it passes upward through passage 12 and is discharged at outlet 13, from where it discharges through pipe 14 for disposal. At the same time that oil containing sludge is charged into tank 1, the alkaline solution, solvent or miscible substance is charged into tank 8 in quantities to accomplish the desired purpose, and flows through central feed shaft 9 downward to the lower portion of the machine, through outlet at 10, where it comes into intimate contact and is mixed with the sludge which has already been separated within the machine, and passes upward in mixture with same at outer part of bowl, 11, and passes through upward passage 12, through outlet 13, from where it discharges through pipe 14 for disposal.

If it is not desirable or practical for the particular stock under treatment to use feed tank 8 as described, through central feed shaft 9 and opening 10, feed tank 15 is provided and will be used instead of feed tank 8 for the alkaline solution, solvent or miscible substance, in which case the alkaline solution, solvent or miscible substance will be fed through feed tank 15 and inlet pipe 16 to sludge outlet 13, where it will react with, dissolve or mix with the sludge and cause it to flow freely from the outlet 14, which is the purpose of this invention.

Outer part of bowl, 11, passage 12, outlet 13, through, to and including 14, are the parts of the machine which become clogged with sludge and interfere with the continuous operation of the machine. It will be particularly noted that the introduction of the alkaline solution, solvent or miscible substance is made at a point within the machine at which it does not touch nor come in contact with the oil at any time, either before separation or after separation from the sludge, and this in particular is one of the new and novel steps of the invention. It is essential that the oil be kept pure and free from substances used in the process, and this is done in my process, although the solution, solvent or miscible substance is introduced continuously during the continuous separation of sludge in the machine.

It will be noted from the above that provisions have been made for the introduction of alkaline solution, solvent or miscible substance into the centrifuge machine at two different points, either one to be used as described, and it is not essential that the machine be provided with both.

It is to be understood that the above description is for the purposes of illustration only, and the method is not necessarily limited thereto.

Having described the method of my invention, what is claimed as new and desired to be protected by Letters Patent is:

1. An improvement in the art of separating sludge from a mixture of acid treated lubricating oil and sludge resulting from such treatment in a centrifuge machine which consists in introducing an alkaline solution into the centrifuge machine during its operation to the separated sludge in the machine while continuously separating further sludge by operation of the machine, said alkaline solution re-acting within the machine with the sludge after it has been separated from the oil to form a mixture that will flow freely from the machine while in operation.

2. An improvement in the art of continuously separating sludge from a mixture of mineral acid treated oil and sludge resulting from such treatment in a centrifuge during its operation which resides in the step of introducing a solvent for the sludge into the centrifuge machine to the separated sludge in the machine while continuously separating further sludge by centrifugal force which solvent will combine within the machine with the sludge after it has been separated from the oil to form a mixture that will flow freely and continuously from the machine.

3. An improvement in the art of continuously separating sludge from a mixture of sulphuric acid treated oil and sludge resulting from such treatment in a centrifuge machine during its operation, which resides in the step of introducing a substance miscible with the sludge into the centrifugal machine exclusively to the separated sludge in the machine, while continuously separating further sludge by centrifugal force, to form a mixture that will flow freely and continuously from the machine, the solution at no time coming into contact with the finished oil from which the sludge has been extracted.

4. The process of separating sludge from oil which consists in introducing into a centrifuge machine a mixed oil and sludge and separating the sludge from the oil by centrifugal force, thus throwing the sludge to the outer periphery of the machine, introducing into the machine while in operation a solvent for the sludge and delivering it into the centrifuge machine at its outer periphery, and continuously discharging the oil and the dissolved sludge at the same time from the machine.

In testimony whereof I have signed my name to this specification. Signed at Fillmore, in the county of Ventura, State of California, this fourth day of January, 1923.

JAMES W. WEIR.

Witnesses:
F. L. GAY,
S. A. WAGNER.